Aug. 15, 1933.  C. ROEHRICH  1,922,982
MANUFACTURE OF PHOTOGRAPHIC PICTURES
Filed Feb. 9, 1931

Inventor:
CARL ROEHRICH
By Robb & Robb
Attorneys

Patented Aug. 15, 1933

1,922,982

UNITED STATES PATENT OFFICE 1,922,982

MANUFACTURE OF PHOTOGRAPHIC PICTURES

Carl Roehrich, Berlin, Germany, assignor to the firm Silfree Aktiengesellschaft, Vaduz, Germany Application February 9, 1931, Serial No. 514,672, and in Germany February 14, 1930

22 Claims. (Cl. 95—5)

My invention relates to a process for manufacturing photographic pictures and is more particularly concerned with the producing of photographic pictures on films or plates sensitized for a hardening procedure.

In my copending applications, Serial Nos. 371,733, filed June 17, 1929; 337,738, filed February 5, 1929 (Patent No. 1,840,529, issued January 12, 1932); 347,454, filed March 15, 1929; 332,475, filed January 14, 1929 (Patent No. 1,843,001, issued January 26, 1932); 331,384, filed January 9, 1929; and 416,204, filed December 23, 1929 (Patent No. 1,885,063, issued October 25, 1932); I have described various improvements relating to the manufacture of photographic pictures and relating in some parts to an after-treatment of the films which results in a more complete hardening of those sections of the film, which had been struck by light rays during the previous exposure. Other parts of my pending patent applications are more particularly concerned with the coloring of the pictures in different colors.

The present invention relates to a new type of after-treatment for ensuring complete hardening of the picture-sections in question; and it is further concerned with an improved coloring method for the pictures. Both these improvements have been found useful per se and moreover also their combination leads to very good results, as the two steps tend to assist one another in a manner, which shall be described in detail in a later part of this specification.

In my copending patent applications Ser. Nos. 337,738 and 416,204 the superiority of photographic pictures containing completely hardened sections over pictures with incompletely hardened sections has been explained in detail, and by referring to these prior applications the repeating of these explanations is deemed dispensable.

Different methods of producing colored pictures from films sensitized for a hardening procedure have been described, for instance, in my copending patent application Ser. No. 332,475 to which reference is made for the general points of the coloring methods.

It is an object of the present invention to produce photographic pictures, light-struck sections of which are completely hardened across or through the whole thickness of the photo-sensitive colloid layer.

It is a further object of this invention to completely harden sections of the film, incomplete hardening of which had been effected in the course of the previous exposure to light rays.

It is a further object of the invention to produce multi-colored films by applying to selected parts of the film surface one color and by causing parts of the film to imbibe liquid dyes differing in color from the color applied to the surface.

It is another object of the invention to produce films with completely hardened picture sections, other sections of the film being dyed in one color along their upper surface and in a different color in the parts lying below this surface.

Other objects will be in parts obvious or in part pointed out hereinafter.

One of the wellknown methods of sensitizing photographic bodies for a hardening procedure,—that is for a procedure in which the resulting photographic picture is composed of variously hardened sections, and in which the different degrees of hardness correspond to the different shades of the picture,—consists in photo-sensitizing the colloid layer of the film or plate by means of bichromates. Other suitable sensitizing means can be used as well.

When the photo-sensitized layers are exposed to light under a negative, the sections of the layer which are in register with the clear sections of the negative will be struck by the full amount of copying light and hardening of these sections will result under the action of the light. Though it is important for the quality of the picture that these sections are hardened throughout, i. e. down to the ground or bottom of the colloid layer, it is difficult to achieve this result during the exposure itself.

Complete and uniform hardening of the concerned sections may be accomplished by long exposure or by storing in a moist atmosphere. However, these possibilities harbour serious difficulties in view of the expense incident to their realization, e. g., the element of time introduced in both cases makes either case exceedingly costly. Furthermore, the application of the above mentioned storage treatment in a moist atmosphere presents appreciable difficulties in case of long films, where comparatively spacious storage rooms are required.

I have found that complete hardening can be achieved quickly and in a very simple manner by means of an after-treatment, which in general consists in applying heat to the partially hardened film.

In a preferred form the invention is carried out as follows. The film is first in the usual way exposed to the copying light under a negative. The film is then moistened in any suitable manner, for instance, by passing the film through a moist atmosphere, for instance, through an atmosphere of water vapors, or through a liquid bath, or by sprinkling the surface of the film etc. To the thus moistened film heat is then applied, for instance, by passing the film over a suitably heated roller. I have found that the heat exerts a very favourable effect, and in fact causes complete hardening of the sections of the film which during the copying had been in register with the clear or fully transparent sections of the negative, but had not been hardened throughout.

Temperatures up to 100 degrees centigrade may be used. Satisfactory results have been reached with temperatures in the range of 40 to 60 degrees centigrade. The most preferable exact temperature depends in each single case from the film material, on the speed with which the film is moved over the roller, on the degree of moisture absorbed in the previous step of the treatment and on other dates, as will be obvious to anybody skilled in the art. I prefer to use in the step of heating dry heat.

Moistening as well as the heat-treatment are applied for comparatively short times; periods up to one minute and less have been found sufficient for each the moistening and the heating step, though in some cases it might be advisable to take a little longer period.

It might be pointed out that both these steps are essentially different from the wellknown steps of washing the film for the purpose of lixiviating certain chemical compounds out of the colloid layer, and also from the step of drying the film.

It has been further ascertained, that the other sections of the film, i. e. those sections which during the exposure were in register with the shaded parts of the negative, will not be affected by the heat after-treatment. In other words, these last mentioned sections retain their softness, which, as is known, is a necessary condition for the further development of the type of photographic pictures in question. Probably hardening of these other sections is prevented by the content of moisture present in these sections.

The application of moisture to the exposed film produces a strong relief in the colloid layer. In this state it is possible to color the surfaces of the highest elevated parts of the colloid layer without affecting the less elevated parts. These elevated parts correspond to the sections of the film in which the least hardening and in practice no hardening at all had occurred during the exposure. For applying the color to these elevated surfaces anyone of the wellknown suitable means may be used; such as, for instance, a coloring roller. As a rule the strong relief character will pass away during the further developing of the picture.

According to the invention multicolored films are produced by coloring the surfaces of these completely soft or unhardened sections in one color, and by combining this coloring step with the step of causing imbibition of liquid dyes into the unhardened and into the partially hardened sections of the colloid layer.

The expression "partially hardened" refers to those sections of the colloid layer, which during exposure were in register with the half-tones of the negative. This expression clearly differs from the expression "incompletely hardened" which throughout the specification and claims refers to those sections of the layer, which during exposure were in register with the clear or fully transparent parts of the negative.

To facilitate the understanding of the part of the invention concerned with the producing of multicolored films I shall now describe the different coloring stages with reference to the annexed sheet of drawings in which Fig. 1 shows at a greatly enlarged scale a cross-section through a film in unexposed state.

Figure 1:
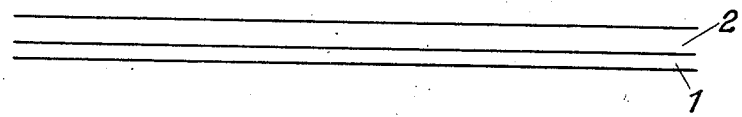

Referring to Fig. 1, 1 designates the film carrier which in most cases consists of a suitable cellulose compound. Carrier 1 is coated with a suitable photo-sensitive layer 2, such as gelatine, glue or the like.

Figure 2:
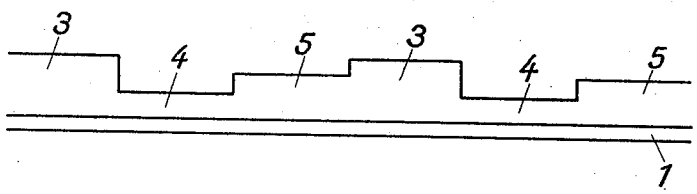
Fig. 2 is a cross-section of the film which has been exposed and subsequently moistened and in a diagrammatic or schematic manner shows the differently hardened sections.
Figure 3:
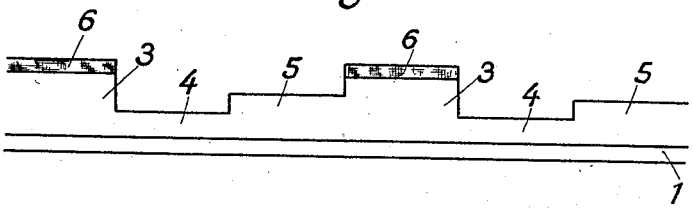
Fig. 3 is a similar view of the film after the step of applying color to part of the film surface has been carried out.
Figure 4:
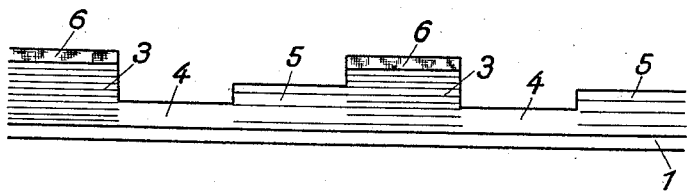
Fig. 4 shows the distribution of color after the imbibition step has been performed.

During the exposure under a negative different sections of the layer 2 will harden to different degrees under the action of the light. When moisture is then applied to the film the differentially hardened sections will absorb the moisture, whereby a swelling of the sections is caused. Moreover, the various sections will absorb different amounts of moisture according to their degree of hardness, and different degrees of swelling will accordingly occur. In Figs. 2, 3 and 4, 3 designates the unhardened sections, which correspond to the full shades or full tones of the negative used for exposure. 4 designates the sections, which correspond to the clear sections of the negative: and 5 designates the so-called half-tones.

According to Fig. 3 the surfaces of section 3 are colored yellow. As seen in Fig. 4 the coloring is completed by causing a colored liquid to penetrate into the soft sections 3 and into the partially soft sections 5 of the film. The most color will enter into sections 3, which in Fig. 4 are by cross-hatching designated as colored blue. Smaller amounts of the blue color will be imbibed by the partially hardened sections 5, while sections 4 will be left clear—provided that complete hardening of these sections has been reached.

It is apparent from the foregoing, that it is advisable to perform the after-treatment with heat and thereby to completely harden sections 4, before the blue color has had an opportunity to creep into the lower, not yet hardened parts of sections 4. It is therefore advisable to perform the after-treatment with heat either before or immediately after treating the film with the liquid color, when the color has not yet had time to penetrate into the deepest parts of sections 3 and 5 adjacent the incompletely hardened parts of sections 4.

If the film shown in Fig. 4 is projected onto a screen, the picture parts corresponding to sections 5 of the film will be blue, the parts corresponding to sections 4 will be white, and the parts corresponding to sections 6 will be green.

A great variety of color distribution can be reached by choosing other color combinations. It is also possible to dye sections 4, too, as described in more detail in my copending patent application Ser. No. 332,475.

I wish it to be understood that where the expression "film" is used throughout the specification and claims, this expression shall also include plates.

In the same way the expression "negative" shall comprise also a "positive". In fact the previously described coloring process belongs to the so-called "positive processes", where a positive is made directly from a positive.

What is considered new and desired to secure by Letters Patent is pointed out in the following claims:

1. In the manufacture of photographic pictures on colloid layers, sensitized for being hardened where light struck, the step of applying dry heat to the said layer after the layer had been exposed to light under a negative and while the layer is still sensitive, whereby complete hardening of incompletely hardened sections is accomplished, the heating period being sufficiently short in time as to leave the unexposed sections of said layer unhardened.

2. The manufacture of photographic pictures on colloid layers, sensitized for being hardened where light struck, which contains the steps of exposing the sensitized layer to light under a negative; of moistening said layer, and of applying dry heat to the layer for a comparatively short time while the layer is still sensitive, whereby complete hardening is achieved in section, which had been incompletely hardened during the exposure, the heating period being sufficiently short in time as to leave the unexposed sections of said layer unhardened.

3. In the manufacture of photographic pictures on colloid layers, sensitized for being hardened where light struck, the steps of moistening said layer subsequent to the exposing of the layer to light under a negative, and of subjecting said layer to the influence of dry heat for not more than one minute while the layer is still sensitive, whereby complete hardening of incompletely hardened sections is accomplished.

4. In the manufacture of photographic pictures on films having a colloid layer, sensitized for being hardened where light struck, the steps of moistening said film and of passing said film over a hot roller while the layer is still sensitive, whereby under the action of the heat complete hardening of incompletely hardened sections is achieved, the heating period being sufficiently short in time as to leave the unexposed sections of said layer unhardened.

5. In the manufacture of photographic pictures on colloid layers, sensitized for being hardened where light struck, the steps of moistening said layer subsequent to the exposing of the layer to light under a negative, and of subjecting said layer to the influence of dry heat at a temperature of not more than 100 degrees centigrade while the layer is still sensitive, whereby complete hardening of incompletely hardened sections is accomplished, the heating period being sufficiently short in time as to leave the unexposed sections of said layer unhardened.

6. In the manufacture of photographic pictures on colloid layers, sensitized for being hardened where light struck, the steps of moistening said layer subsequent to the exposing of the layer to light under a negative, and of subjecting said layer to the influence of heat at a temperature between 40 to 60 degrees centigrade while the layer is still sensitive, whereby complete hardening of incompletely hardened sections is accomplished, the heating period being sufficiently short in time as to leave the unexposed sections of said layer unhardened.

7. In the manufacture of photographic pictures on colloid layers, sensitized for being hardened where light struck, the steps of moistening said layer subsequent to the exposing of the layer to light under a negative, said moistening being effected by subjecting the colloid layer to the action of water vapors, and of subsequently subjecting said layer to the influence of dry heat while the layer is still sensitive, whereby complete hardening of incompletely hardened sections is accomplished, the heating period being sufficiently short in time as to leave the unexposed sections of said layer unhardened.

8. In the manufacture of photographic pictures on colloid layers, sensitized for being hardened where light struck, the steps of moistening said layer subsequent to the exposing of the layer to light under a negative, said moistening being effected by passing said layer to a liquid bath and of subsequently subjecting said layer to the influence of dry heat while the layer is still sensitive, whereby complete hardening of incompletely hardened sections is accomplished, the heating period being sufficiently short in time as to leave the unexposed sections of said layer unhardened.

9. The manufacture of photographic pictures on colloid layers, sensitized for being hardened where light struck, which contains the steps of exposing the sensitized layer to light under a negative containing full-shades, half-tones and clear sections; of treating the said layer in a moist atmosphere, whereby the sections of the layer, which had been in register with the full-shades will absorb a comparatively great amount of moisture, the section of the layer corresponding to the half-tones of the negative will absorb less moisture than the first mentioned sections and the sections of the layer corresponding to the said clear sections will absorb still less moisture; and of then subjecting said layer to the action of dry heat for not more than a minute while the layer is still sensitive, whereby complete hardening is effected of those sections of the layer, which during exposure had been in register with the clear sections of the negative.

10. In the manufacture of multicolored photographic pictures on colloid layers, sensitized for being hardened where light struck, the steps of moistening said layer subsequent to the exposing of the layer to light under a negative; of coloring parts of the surface of said layer with a suitable dye; and of subjecting the layer to imbibition of a liquid dye, said liquid dye differing in color from said first named dye.

11. The manufacture of photographic pictures on colloid layers, sensitized for being hardened where light struck, which contains the steps of exposing the sensitized layer to light under a negative; of moistening said layer; of applying a suitable dye to part of the surface of said layer by means of a coloring roller, and of passing said layer through a color bath, the color of said bath being different from the color of said first named dye.

12. The manufacture of photographic pictures on colloid layers, sensitized for being hardened where light struck, which contains the steps of exposing the sensitized layer to light under a negative containing full-shades, half-tones and clear sections; of treating the said layer in a moist atmosphere, whereby the sections of the layer, which had been in register with the full-shades will absorb a comparatively great amount of moisture, the section of the layer corresponding to the half-tones of the negative will absorb less moisture than the first mentioned sections and the sections of the layer corresponding to the said clear sections will absorb still less moisture; of coloring with a suitable dye those parts of the surface of said layer which correspond to the sections in register with the full shades during exposure, by means of passing a coloring roller over the surface of the colloid layer; and of subsequently treating the colloid layer with a colored liquid, differing in color from said above mentioned dye, said liquid penetrating into the sections previously in register with the half-tones of the negative, and, beneath said surface dye, into the sections previously in register with the full-shades of the negative.

13. In the manufacture of photographic pictures on colloid layers, sensitized for being hardened where light struck the steps of moistening said layer subsequent to the exposing of the layer to light under a negative; whereby a relief surface is formed on said layer; of applying color to the most elevated parts of said relief surface; of subjecting said layer for a comparatively short time to the action of heat, whereby complete hardening of those sections of the layer is reached, which are positioned beneath the least elevated parts of the relief surface; and of subsequently treating said layer with a colored liquid, differing in color from the said first mentioned color, whereby the liquid color is absorbed at a high degree by the said sections which are positioned beneath the most elevated parts of the relief surface, and at a smaller degree by the sections corresponding to somewhat less elevated parts of the relief surface; the said completely hardened sections being left free from the said liquid color.

14. In the manufacture of photographic pictures on colloid layers, sensitized for being hardened where light struck, the steps of moistening said layer subsequent to the exposing of the layer to light under a negative; whereby a relief surface is formed on said layer; of applying color to the most elevated parts of said relief surface; of then treating said layer with a colored liquid, differing in color from the said first mentioned color, whereby the liquid color is absorbed at a high degree by the sections of said layer which are positioned beneath the most elevated parts of the relief surface, and at a smaller degree by the sections correseponding to somewhat less elevated parts of the relief surface; and of then subjecting said layer for a comparatively short time to the action of heat, whereby complete hardening of the said sections of the layer is reached, which are positioned beneath the least elevated parts of the relief surface, and whereby furthermore creeping of the colored liquid into these last named sections is prevented.

15. In the manufacture of cinematographic films containing colloid layers sensitized for hardening where light struck, the step of applying heat to the said layer after the layer has been exposed to light under a negative and while the layer is still sensitive, whereby complete hardening of incompletely hardened sections is accomplished, the heating period being sufficiently short in time as to leave the unexposed sections of said layer unhardened.

16. The manufacture of cinematographic films containing colloid layers sensitized for being hardened where light struck, comprising the steps of exposing the sensitized layer to light under a negative, of moistening said layer, and of applying heat to the layer for a comparatively short time while the layer is still sensitive, whereby complete hardening is achieved in sections which have been incompletely hardened during the exposure, the heating period being sufficiently short in time as to leave the unexposed sections of said layer unhardened.

17. In the manufacture of cinematographic films having colloid layers sensitized for being hardened where light struck, the steps of moistening said layer subsequent to the exposing of the layer to light under a negative, and of subjecting said layer to the influence of heat for not more than one minute while the layer is still sensitive, whereby complete hardening of incompletely hardened sections is accomplished.

18. In the manufacturing of cinematographic films having colloid layers sensitized for being hardened where light struck, the steps of moistening said layer subsequent to the exposing of the layer to light under a negative, and of subjecting said layer to the influence of heat at a temperature of not more than 100 degrees centigrade while the layer is still sensitive, whereby complete hardening of incompletely hardened sections is accomplished, the heating period being sufficiently short in time as to leave the unexposed sections of said layer unhardened.

19. In the manufacture of cinematographic films having colloid layers sensitized for being hardened where light struck, the steps of moistening said layer subsequent to the exposing of the layer to light under a negative, said moistening being effected by subjecting the colloid layer to the action of water vapors, and of subsequently subjecting said layer to the influence of heat while the layer is still sensitive, whereby complete hardening of incompletely hardened sections is accomplished, the heating period being sufficiently short in time as to leave the unexposed sections of said layer unhardened.

20. In the manufacture of cinematographic films having colloid layers sensitized for being hardened where light struck, the steps of moistening said layer subsequent to the exposing of the layer to light under a negative, said moistening being effected by passing said layer through a liquid bath, and of subsequently subjecting said layer to the influence of heat while the layer is still sensitive, whereby complete hardening of incompletely hardened sections is accomplished, the heating period being sufficiently short in time as to leave the unexposed sections of said layer unhardened.

21. The manufacture of cinematographic films having colloid layers sensitized for being hardened where light struck, comprising the steps of exposing the sensitized layer to light under a negative containing full-shades, half-tones and clear sections, of treating the said layer in a moist atmosphere whereby the sections of the layer which were in register with the full-shades will absorb a comparatively great amount of moisture, the sections of the layer corresponding to the half-tones of the negative will absorb less moisture, and of then subjecting said layer to the action of heat for not more than a minute while the layer is still sensitive, whereby complete hardening is effected of those sections of the layer which, during exposure, were in register with the clear sections of the negative.

22. In the manufacture of photographic pictures on colloid layers sensitized for being hardened where light struck, the step of moistening said layer subsequent to the exposing of the layer to light under a negative, and of subjecting said layer to the influence of heat at a temperature between 60 to 100 degrees centigrade, whereby complete hardening of incompletely hardened sections is accomplished, the heating period being sufficiently short in time as to leave the unexposed sections of said layer unhardened.

CARL ROEHRICH.